Nov. 20, 1956    P. MAUBORGNE    2,771,253
LINE-WINDING MECHANISM FOR FISHING REELS WITH FIXED DRUMS
Filed Dec. 18, 1952
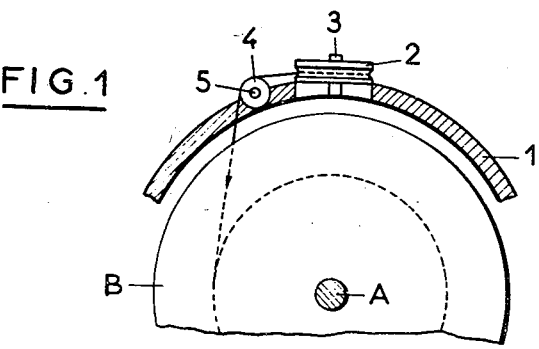
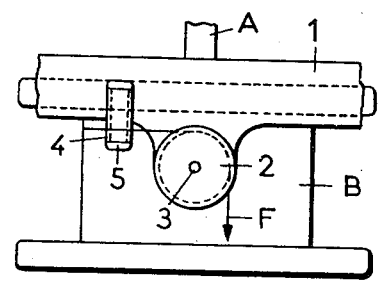
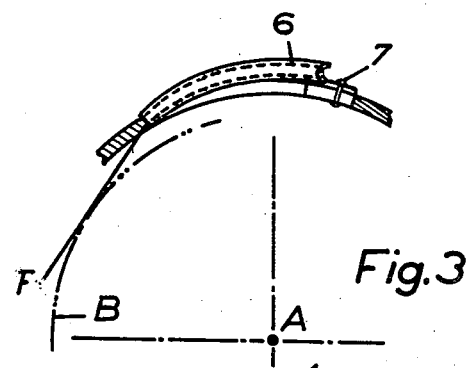
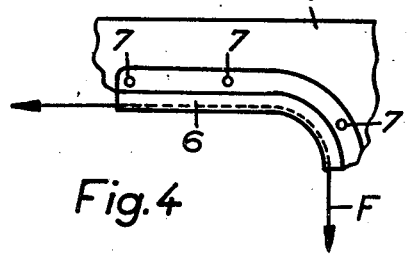
Inventor
Paul Mauborgne

United States Patent Office 2,771,253
Patented Nov. 20, 1956

2,771,253

LINE-WINDING MECHANISM FOR FISHING REELS WITH FIXED DRUMS

Paul Mauborgne, Bernouville (Eure), France

Application December 18, 1952, Serial No. 326,658

Claims priority, application France December 21, 1951

2 Claims. (Cl. 242—84.1)

This invention relates to a line-winding mechanism for fishing reels of the kind having a fixed drum, that is a drum mounted for free delivery of the line therefrom substantially axially of the drum, the drum being held against rotation during delivery of the line.

Line-winders of known kinds are provided with a single roller which may or may not turn about its axis and which is engaged by the line during rewinding.

The line, which is substantially parallel to the axis of rotation of the reel, that is to say, parallel to the fishing rod, is deflected by the roller into the transverse plane and in a direction in this plane tangent to the circumference of the spool on which the line is wound. Under these circumstances, the axis of rotation of the roller is in the transverse plane and perpendicular to the winding tangent. This device makes it necessary to have a roller of very small diameter in order to reduce the projection as much as possible, with the entanglement risks entailed thereby. From this it follows that the thread is subjected to injurious torsional stresses and the winding efforts are greater than necessary.

According to the present invention, the total curvature of the thread is divided into two curves, one of which is that of a curved deflecting member having a radius of curvature substantially greater than that of a conventional size roller. The axis of this member when in form of a roller is perpendicular to the axis of the reel and deflects the line from a direction substantially parallel to the axis of the drum to continue in a plane substantially perpendicular to the drum axis. The other curve is that of another member curved to deflect the line in said plane to continue in a direction substantially tangentially to the drum. The curve of the second named deflecting member has a radius of curvature substantially smaller than that of the first named deflecting member.

Under these circumstances it is obvious that the change of direction of the thread effected during the passage over the second roller will take place at an acute angle, the two portions of the line on both sides of the roller thus forming an obtuse angle, thus reducing the torsional effect.

According to a modification of the inventive idea, the double change of direction could be obtained by means of a bent channel having two curves in two perpendicular planes, or, in more general terms, by means of a tortuous bent channel, the extreme radii of curvature of which are at right angles to one another.

Two forms of the construction according to my invention are described hereinafter but are not intended to limit the scope of the invention. Many changes and modifications may be made without departing from the spirit of the invention as defined in the appended claims.

The specification is accomplished by drawings in which:
Fig. 1 is a partially sectioned fragmentary elevation of a fishing reel, illustrating the line winding mechanism according to my invention;

Figure 2 is a plan view of the reel of Figure 1; and

Figures 3 and 4 are analogous illustrations of a modification of my line winder.

In Figures 1 and 2, A indicates the axis of the reel, and B the circumference of the spool on which the line is wound.

1 indicates the reel rotor which carries the member usually referred to as the pick-up, and 2 indicates the large roller, the axis 3 of which is perpendicular to the axis A of the reel.

4 indicates the second roller, the axis 5 of which is parallel to the axis A of the reel.

As shown in Figure 2, the line F engages over the roller 2 which subjects the line to the first change of direction of about 90°, and then engages over the roller 4, which subjects it to a second change of direction through an angle substantially acute, in such a manner as to send it tangentially to the spool B, as can be seen in Figure 1.

In Figures 3 and 4, the two rollers are replaced by a bent channel 6 having two curves, of suitably hard material, this channel being constructed in the form of a piece fastened to the reel rotor 1 by means of rivets 7.

As shown in Figures 3 and 4, this channel subjects the line thread to two changes of direction which correspond to those effected by the rollers described hereinbefore in connection with the other form shown to practice the invention.

What I claim is:

1. In a fishing reel including a reel rotor and a drum adapted to hold a fishing line and mounted for free delivery of the line therefrom substantially axially of the drum, the provision on the reel rotor of a member curved to deflect the line from a direction substantially parallel to the axis of the drum to continue in a plane substantially perpendicular to said axis, that is, in a direction substantially at right angles to the first named direction, the curve of said member having a radius of curvature substantially greater than that of a conventional size roller, and of another member curved to deflect the line in said plane to continue in a direction substantially tangential to the drum and making with the second named direction an acute angle, the curve of the second named deflecting member having a radius of curvature substantially smaller than that of the first named deflecting member.

2. In the fishing reel according to claim 1, a roller having its axis perpendicular to the axis of the drum, and another roller having its axis parallel to the axis of the drum, the first named roller forming said first named deflecting member, and the second named roller forming said second named deflecting member.

References Cited in the file of this patent

UNITED STATES PATENTS

| | | |
|---|---|---|
| 321,382 | Petersen | June 30, 1885 |
| 1,916,732 | Le Tourneau | July 4, 1933 |
| 1,955,785 | Ackema et al. | Apr. 24, 1934 |
| 2,514,345 | Small | July 4, 1950 |
| 2,548,073 | Siegrist | Apr. 10, 1951 |
| 2,551,321 | Ferguson | May 1, 1951 |
| 2,602,606 | Hanse | July 8, 1952 |
| 2,630,979 | Uerling | Mar. 10, 1953 |

FOREIGN PATENTS

| | | |
|---|---|---|
| 22,597 | Great Britain | of 1907 |